United States Patent [19]

Franke

[11] Patent Number: 5,561,936

[45] Date of Patent: Oct. 8, 1996

[54] FLOATING AQUATIC SPECIMEN COLLECTION NET

[75] Inventor: Floyd N. Franke, P.O. Box 629, Roscoe, N.Y. 12776

[73] Assignee: Floyd N. Franke, Roscoe, N.Y.

[21] Appl. No.: 465,826

[22] Filed: Jun. 6, 1995

[51] Int. Cl.⁶ .................................................. A01K 71/00
[52] U.S. Cl. .................................................................. 43/7
[58] Field of Search ................................. 43/7, 9.1, 104, 43/103, 102

[56] References Cited

U.S. PATENT DOCUMENTS

| | | | |
|---|---|---|---|
| 2,549,475 | 4/1951 | Jardim | 43/7 X |
| 2,767,501 | 10/1956 | Bjorksten | 43/7 |
| 3,412,498 | 11/1968 | Niskin | 43/9.1 X |
| 3,548,531 | 12/1970 | Holden | 43/9.1 X |
| 3,688,433 | 9/1972 | Niskin | 43/7 X |
| 4,244,323 | 1/1981 | Morimura | 43/102 |
| 4,429,659 | 2/1984 | Holyoak | 43/103 |
| 4,631,851 | 12/1986 | Whitehurst | 43/7 |
| 4,703,577 | 11/1987 | Gubash | 43/7 |

FOREIGN PATENT DOCUMENTS 23532 of 1913 Norway ................................. 43/104

OTHER PUBLICATIONS

Ward's Natural Science Establishment, Inc. of Rochester, NY, Catalogue pp. 591–592.

Primary Examiner—Joseph J. Hail, III
Assistant Examiner—Jay A. Stelacone
Attorney, Agent, or Firm—David E. Crawford, Jr.

[57] ABSTRACT

A collection apparatus for collecting specimens of a predetermined size floating within a body of water comprises a net and a float connected to the net. The net has a mesh surrounded by a periphery. The float has a sufficient buoyancy to maintain the net in a position above the lower surface of the body of water and in a generally stationary attitude relative to the upper surface of the body of water.

12 Claims, 5 Drawing Sheets

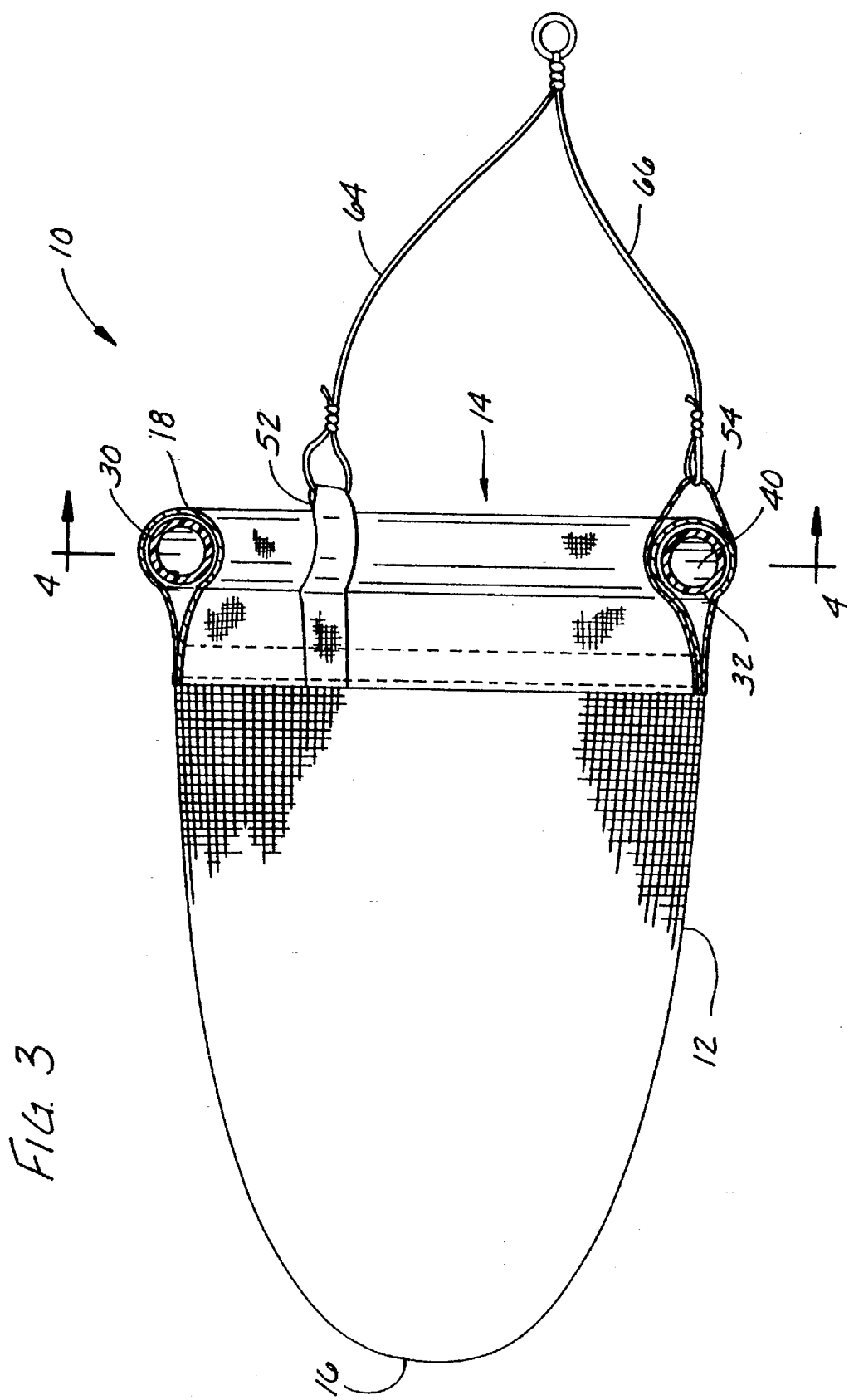

FLOATING AQUATIC SPECIMEN COLLECTION NET

FIELD OF THE INVENTION

The present invention is directed to a net for collecting insects. In particular, the present invention is directed to a net which is configured to float within or on top of a body of water at a variety of selected levels and in a variety of selected attitudes to effectively catch insects and other specimens floating within or on top of the body of water. Further, the net is configured to allow these differing flotation levels and attitudes without requiring the user's hands and attention. Thus, the net of the present invention offers a versatility and an ease of use not achieved by prior art nets.

BACKGROUND OF THE INVENTION

Many natural predators including man hunt fish. Although some persons hunt fish for sport, most of these natural predators hunt fish for food. Thus, if the predators catch the fish, the fish are likely to be eaten. Therefore, to be caught by a predator means almost certain death for fish. However, fish have a self-preservation instinct that helps them to intuitively avoid being caught and thus to avoid being killed. The self-preservation instinct of fish makes the fish cautious of unfamiliar objects because these objects may be an indication of a predator or other dangerous situations.

However, fish cannot totally avoid contact with all unfamiliar objects. Like the predators that hunt the fish, the fish must also eat to survive. Thus, the same survival instinct which causes the fish to avoid unfamiliar objects which might be predators, also drives the fish to hunt food to survive. Nonetheless, in their search for food, fish are hesitant to approach unfamiliar objects which may be hungry predators, but will approach familiar objects which they have come to associate with food. For this reason, fish become accustomed to the particular varieties of foods that are naturally occurring in their habitat at any particular time. These food varieties may include both plants and insects that the fish repeatedly come in contact with in the body of water where they live. These plants and insects may either grow and live in the body of water with the fish or the plants and insects fall into the body of water where the fish can find them. For instance, the food varieties may be plankton or other fish, both of which grow and live in the water. Or the food may be a turn or a deer fly, both of which grow and live out of the water but which occasionally fall into the water.

Over time fish become accustomed to changes in their habitat. As a result, objects which are initially unfamiliar to the fish gradually become more familiar as the fish become accustomed to the presence of the objects. Therefore, fish will eventually approach objects which were once unfamiliar. If a new type of food is introduced, the fish will avoid the new food at first, but over time will become accustomed to the presence of the food. As the fish become accustomed to the presence of the new food type, they will eventually approach it, they will recognize the new food type as food, and they will ultimately eat the new food type. Thus, the fish will eventually eat a new food which was initially unfamiliar to them. If a new but similar piece of food is introduced into the habitat and the fish recognize the food as something they ate before without anything unpleasant happening to them, the fish will approach the food more readily than when they encountered that type of food for the first time. Therefore, fish will more readily approach and eat objects which they recognize as food and will avoid objects which they are unfamiliar with.

In most places on Earth, the naturally occurring food types change throughout the year due to seasonal changes in the environment. For instance, throughout most of the United States, flies are abundant in the summer months but are rare in the winter months. Further, flies change throughout the year between various developmental stages. Taking for example the mayfly which is one of the main staples of the trout diet in the Eastern United States, the life cycle of the mayfly begins with an egg at the bottom of a pond or stream. The egg becomes a nymph which remains at the bottom of the water for about one year until it rises to the surface of the water. As the nymph rises, the outer skin of the nymph splits and an adult mayfly hatches from the skin. The adult floats on the surface of the water until its wings spread and dry. Once its wings are dry, the mayfly will take flight and leave the water where it was born, but will eventually return to water to lay eggs to begin the life cycle again. As a result of this life cycle, flies are present in various developmental stages in lakes, ponds, rivers and streams.

Therefore, the fish living in those lakes, ponds, rivers and streams become accustomed to flies in particular developmental stages floating by them in the summer months when the flies are abundant and grow unaccustomed to flies in the winter months when the flies are rare. If a fly is introduced into the habitat of a fish during the summer and the fly is in an appropriate developmental stage, the fish is likely to recognize and eat the fly. However, if a fly is introduced into the same habitat during the winter, the fish is likely to ignore or even avoid the fly because it unaccustomed to having it present during this season. Each spring, the fish reacquaint themselves to the flies and come to associate the flies with food. Further, as flies become abundant in each developmental stage, the fish again reacquaint themselves to the particular developmental stage. Because fish are seasonally accustomed and unaccustomed to particular food types, they will readily eat some food types in the summer months but avoid them in the winter months and vice versa. These habits are further complicated by the fact that at any one time, several different orders of insects in several different developmental stages may be present. Of these various orders and stages, the fish may have a preference for one or more kinds. Further, the available orders and stages change throughout the year and thus the fish change their preferred food throughout the year.

Fishing enthusiasts are aware of these changing habits of fish, as well as, the self preservation instincts of the fish which cause the fish to avoid unfamiliar objects. In order to combat these habits and instincts, the fishing enthusiasts use baits which replicate the natural occurring food of the fish. The foods which these baits replicate include many varieties of plant and insect life. For instance, many fishing enthusiasts use other fish such as minnows as bait to catch fish. Other fishing enthusiasts use artificial lures which replicate worms or small bait fish. Still other fishing enthusiasts use artificial lures which replicate various insects to attract the attention of the fish and cause them to strike the enthusiast's hook. Because many of the artificial lures used by this latter type of fishing enthusiast replicate various varieties of insects commonly referred to as flies, the lures used by this latter type of enthusiast have come to be known as flies. Likewise, this type of fishing enthusiast has come to be known as a fly fishing enthusiast and the sport which the enthusiasts practice has come to be known as fly fishing.

Fly fishing lures are made in many different sizes, shapes and colors to represent many different types of insects which are typically eaten by fish. In addition, the lures are made to represent different types of insects at different developmental stages of life. Thus, there is a large variety of lures to chose from and on any particular fishing trip fly fishing enthusiasts may carry many different lures to represent various insects at several developmental stages. Because the naturally occurring foods differ from location to location and from time to time and because fish will avoid unfamiliar objects, fly fishing enthusiasts attempt to pick a particular lure from their stock of lures which closely resembles the naturally occurring varieties of food in the area at the time so that the fish will not hesitate to approach the lure and eat it. In order to match their lure to the naturally occurring foods, the fishing enthusiasts must determine which varieties of food are naturally occurring at the particular time.

Several methods are available for determining the naturally occurring foods in the area at the particular time. Although a fly fishing enthusiast could randomly choose a fly from his or her stock in order to choose the lure which most closely resembles a naturally occurring food, this generally proves ineffective because in order to find a fly which the fish will strike, the enthusiast has to try each fly in turn until a fly is chosen which results in the enthusiast catching a fish. Further, even if the correct fly is randomly chosen, there is no guarantee that the fly will work at the particular time it is used. Thus, the correct fly may be used and rejected for a less effective lure. Alternatively, the fishing enthusiast might rely upon experience and chose a fly which has worked in the past. However, as the enthusiast travels from place to place or as the seasons change, the fish might begin to avoid the lure which previously worked. Thus, experience is not always the best guide when choosing a fly from the stock. Instead, experience has taught that the best way to chose a fly is to observe the naturally occurring insects in the area and particularly those which are floating in the water being fished and to choose a fly which most closely resembles the naturally occurring insects.

To observe the types of insects falling into the water, fishing enthusiasts can simply note what types of insects which are floating by. However, due to the swiftness of the current and the size and color of the insects, the insects may be difficult to see. In addition, insects floating below the surface may also be difficult to observe. Thus, fishing enthusiasts frequently use nets to collect insect specimens as they float by.

There are several different types of nets in the prior art which may be used for collecting insects and other specimens. A common feature among each of these prior art nets is that they have a fine mesh so that small insects will not pass through the mesh, but instead will be captured within the mesh. Another common feature among the prior art nets is that they use some form of rigid structure surrounding the mesh to hold the mouth of the net open so that a larger number of insects will be collected. However, these prior art nets have drawbacks which make them undesirable when compared with the net of the present invention.

One variety of prior art net is a hand-held net. These nets have a fine mesh surrounded by a rigid frame which maintains the mouth of the net in an open condition, ready for the collection of insects and other specimens. A handle for holding the net is attached to the frame. Although other materials are used, the frames and handles are frequently crafted from metal tubes or barstock. However, the fact that these hand-held nets must be attended during use is the source of a significant disadvantage in that valuable fishing time is lost because the nets must be held in the water with one hand. Since two hands are typically required to fly fish, the fishing enthusiast cannot fish while collecting specimens using a hand-held net.

Another type of prior art net is less frequently used by fishing enthusiasts, but is frequently used by biologists for plankton collection. These plankton nets are made similarly to the hand-held nets except that a bridle is used in place of the handle. The nets are allowed to trail downstream at the end of the bridle. However, because the frames are typically made of metal, the nets are not buoyant, and thus will sink if not used in a swift current or dragged through the water at a high speed. Nonetheless, in a swift current, the nets will trail downstream beneath the surface of the water. This mode of operation highlights a principle disadvantage in collecting insects with the plankton nets. Because insects generally float at or just below the surface of the water, a net suspended well below the surface will not collect many insect specimens. Thus, the plankton collection nets are not well-suited for use by fishing enthusiasts. Further, because fly fishing enthusiasts also fish in ponds and lakes where there is no significant current, the plankton collection nets are difficult to use.

Other types of prior art nets share the problems outlined above when used by fishing enthusiasts for collecting insects. Either the nets require the use of a hand thereby precluding fishing or the nets do not float at the appropriate level within the water to collect insect specimens. However, the inventor has succeeded in inventing a new type of specimen collection net which solves these problems inherent in the prior art nets.

SUMMARY OF THE INVENTION

The aquatic insect collection net of the present invention has a mesh bag with an opening at one end and an adjustable float attached to the opening. In the preferred embodiment, the float is a circular collar made from flexible tubing which surrounds the opening of the mesh bag. The overall buoyancy of the float is adjustable so that the net may be selectively submersed to various levels beneath the surface of the water. In addition, the buoyancy of the float may be varied around the perimeter of the opening so that the opening of the net takes on different attitudes within the water. For instance, the float may be filled with air so that the opening of the net floats on the surface of the water with the mesh bag suspended underneath the float. Alternatively, the float may be filled with water so that the net has no added buoyancy other than the buoyancy of the materials used to construct it. Still another alternative is to partially fill the float with weights such as lead shot. This alternative varies the buoyancy of the float about the perimeter of the opening so that the opening has a tilted or vertical attitude. Each of these various attitudes are advantageous in achieving different goals as are described in greater detail in the Detailed Description of the Preferred Embodiment below.

The versatility in buoyancy permits the net of the present invention to be used without the necessity of holding the net thereby permitting the fishing enthusiast to fish rather than attend to a net. Further, the buoyancy of the net of the present invention may be adjusted to collect insects at or just below the surface of the water. In addition, the construction of the net permits it to be collapsed for storage and transport. Thus, the net of the present invention has many advantages over prior art nets.

Although the summary of the invention is directed primarily to the use of the aquatic specimen collection net of the present invention for fly fishing purposes, it should be understood that the inventor does not envision that the net be limited to this purpose. For instance, the net can be used for other purposes, such as for the collection of plankton and other floating specimens for biological research.

BRIEF DESCRIPTION OF THE DRAWINGS

Further objects and features of the present invention are revealed in the following Detailed Description of the Preferred Embodiment of the invention in the drawing figures wherein:

FIG. 3 is a cross-sectional view taken in the plane of line 3—3 of FIG. 2;

DESCRIPTION OF THE PREFERRED EMBODIMENT

Figure 1:
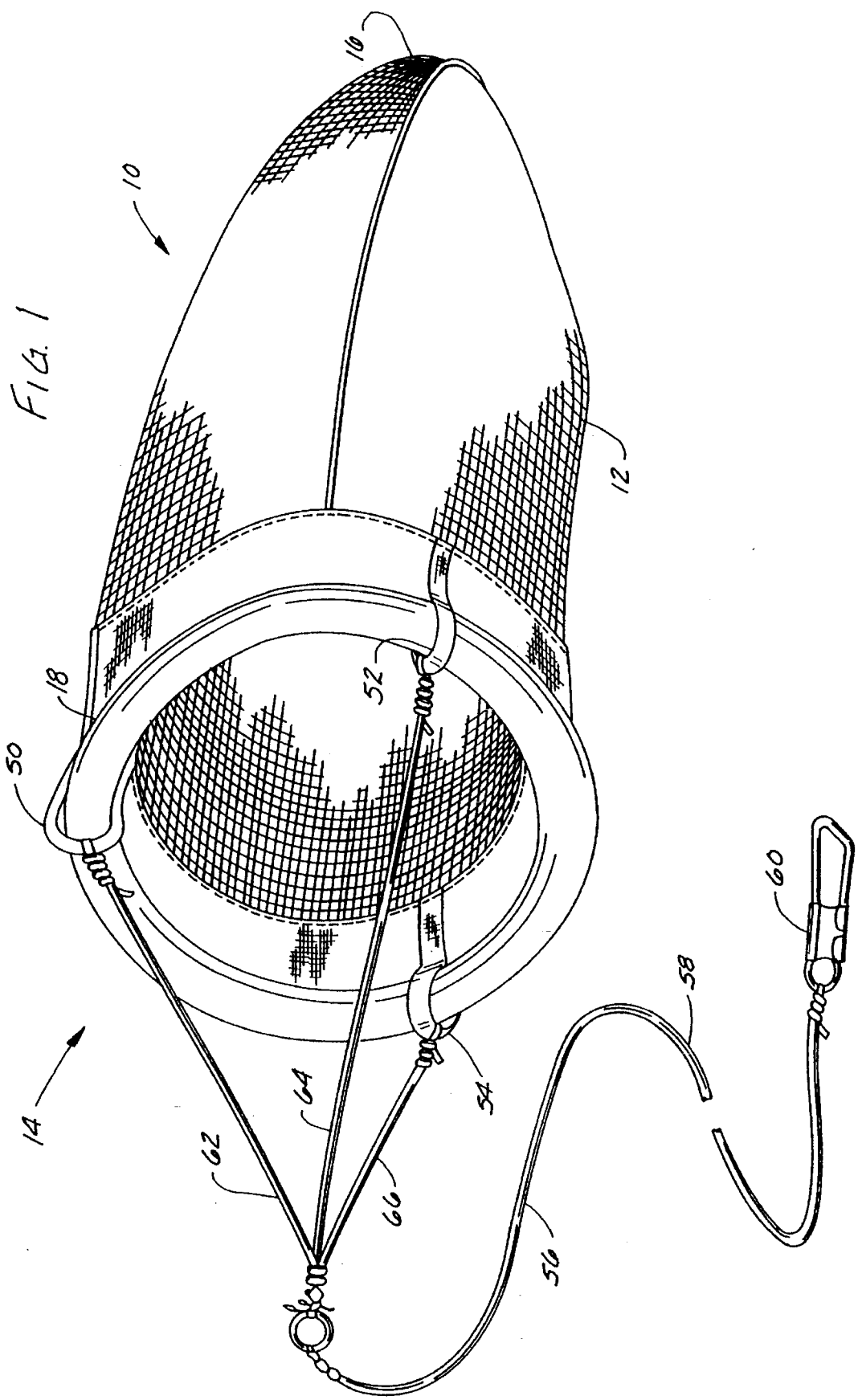
FIG. 1 is a perspective view of the floating aquatic specimen collection net of the present invention.
Figure 2:
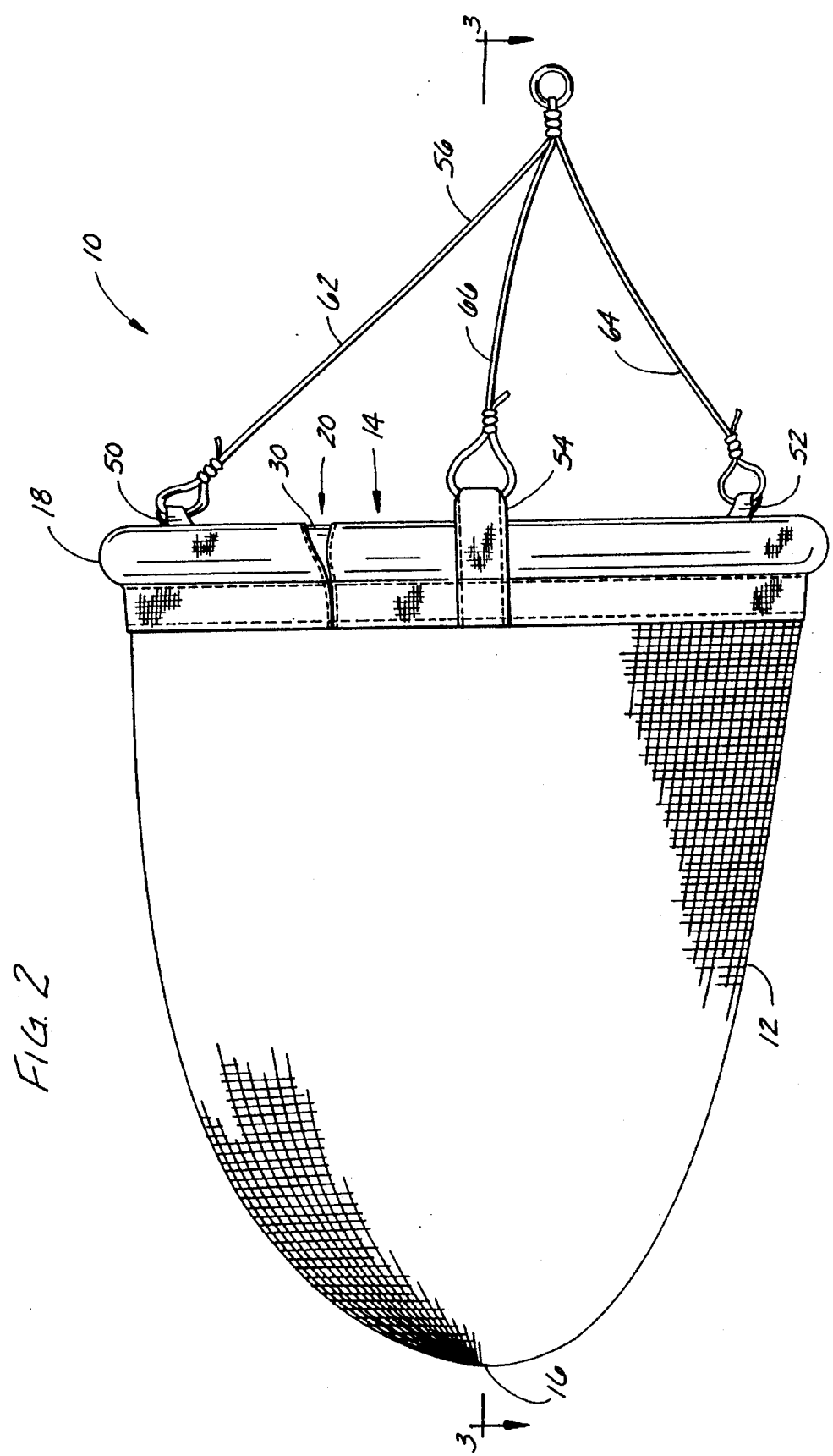
FIG. 2 is a side elevation view of the net.

The specimen collection net 10 of the present invention is generally comprised of a conical or cylindrical mesh bag 12 having an open end 14 and a closed end 16 as shown in FIGS. 1 through 3. A tubular sleeve 18 is sewn around the periphery of the open end 14 of the mesh bag 712. The sleeve 18 includes an opening 20 in at least one location along the periphery of the open end 14 so that a float 30 may be threaded into the sleeve to attach the float to the mesh bag 12.

Figure 4A:
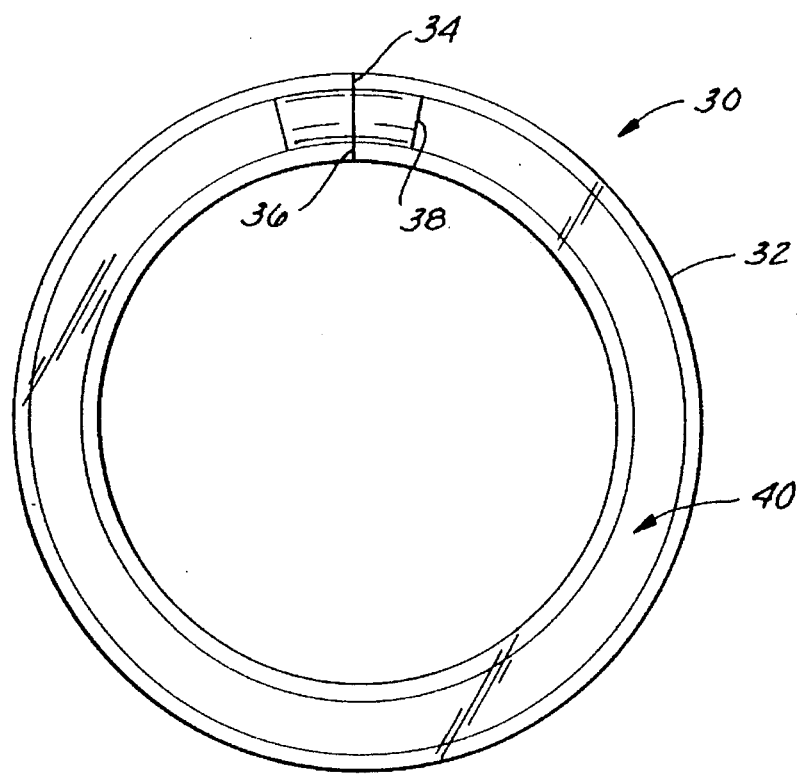
FIGS. 4A and 4B are cross-sectional views of the float taken in the plane of line 4—4 of FIG. 3.
Figure 4B:
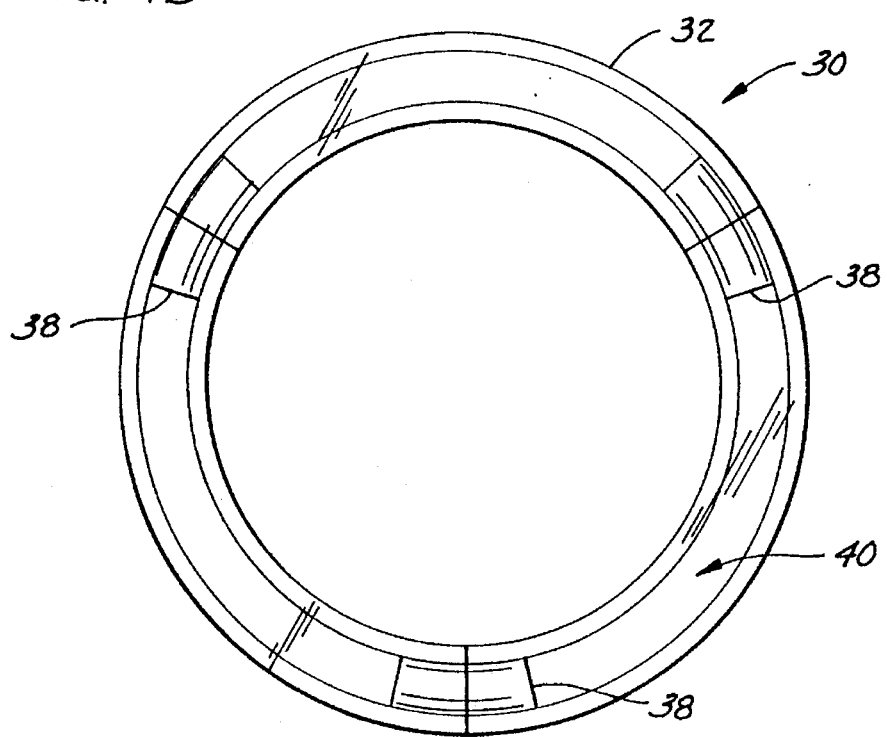

As shown in FIG. 4A, the float 30 is formed of hollow flexible tubing 32 having two ends 34, 36. The tubing 32 is threaded into the sleeve 18 of the bag 12 through the opening 20 until the tubing 32 encircles the entire periphery of the open end 14 of the bag and the ends 34, 36 of the tubing are adjacent one another. A wooden plug 38 made from a short length of dowel is inserted into each of the tubing ends 34, 36 to form a fluid-tight annulus of tubing. The ends of the plug 38 may be chamfered to improve the ease with which the plug may be inserted into the tubing ends 34, 36. Alternatively, several lengths of tubing may be joined with a plurality of plugs to form the annular float 30 as shown in FIG. 4B. The fluid-tight annulus of tubing has an interior 40 which may be filled with a variety of materials depending upon the desired flotation properties of the net 10. For instance, the interior 40 may be filled entirely of air to make the float 30 highly buoyant. Alternatively, the interior 40 may be filled either partially or entirely with water to decrease the buoyancy of the net. In addition, the solid weights 42 may be inserted into the interior of the tubing 32 to decrease the buoyancy of the float at one point about its circumference. Thus, depending upon the types and amounts of the materials inserted into the interior 40 of the tubing 32, the buoyancy of the float 30 may be altered and the attitude of the float may be changed.

Three eyelets 50, 52, 54 are equally-spaced along the sleeve 18 so that a bridle 56 may be attached to the net 10. The bridle 56 permits the net to be tethered to a selected anchor point such as a fishing vest or a tree branch overhanging the water. The bridle 56 is comprised of a cord 58 with a fastener 60 at the end opposite the float 30 for securing the net 10 to the selected anchor point. In the preferred embodiment, three equal length lines 62, 64, 66 are spliced to the end of the cord 58 adjacent the float 30 by any one of several methods which are well known in the art and each of the lines is tied to one of the three eyelets 50, 52, 54. Thus, the tension in the cord 58 and lines 62, 64, 66 is distributed evenly among the equally-spaced eyelets 50, 52, 54 so that the float 30 trails behind the cord at an attitude which is substantially perpendicular to the cord.

Figure 5:
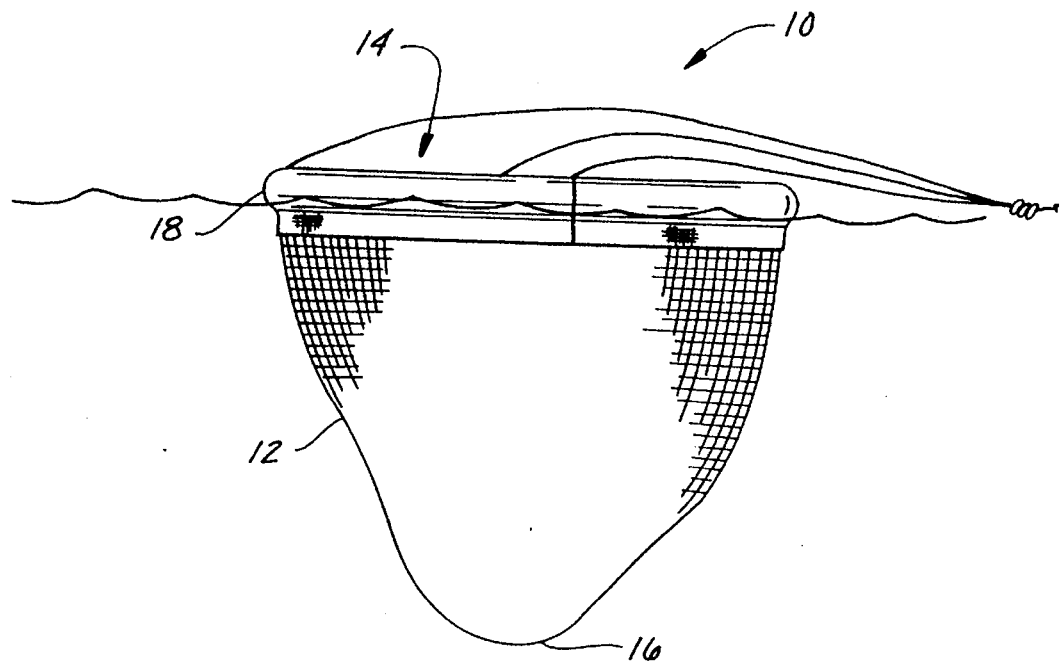
FIG. 5 is a perspective view of the net showing the net in an unweighted, no-flow attitude.
Figure 6:
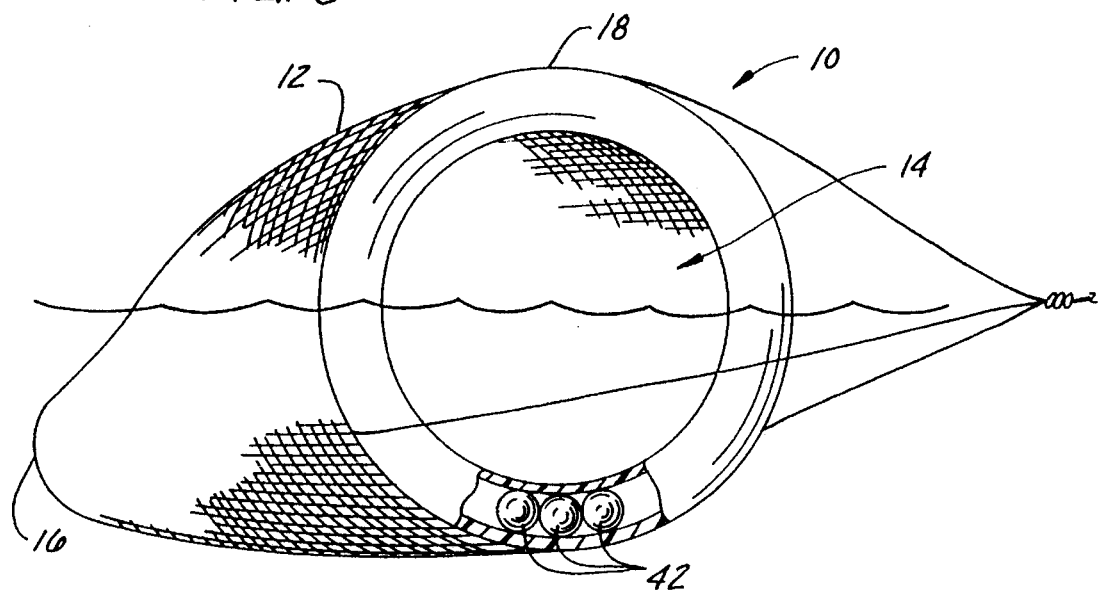
FIG. 6 is a perspective view of the net showing the net in a weighted, partial-flow attitude.

To use the net 10, the fastener 60 is attached to the desired anchor point, and the net is released into a body of water such as a brook, stream or pond, and permitted to drift away from the anchor point. The interior 40 of the tubing 32 may alternately be filled with various substances to change the buoyancy of the float 30. For instance, the interior 38 may be filled with air so that the float has a relatively high buoyancy. When the buoyancy of the float 30 high, the float will float on top of the water and the net 10 will drift below the float 30 in a no-flow attitude as shown in FIG. 5. Although this attitude permits collected specimens to be retained in the net and to be kept wet, this attitude is not particularly effective for catching new specimens because the open end 14 is horizontally positioned at the surface of the water. To tilt the float 30 so that the opening is vertically oriented, a substance having a higher density than air may be inserted in the tubing. For example, a few lead shot may be inserted in the tubing to weight one side of the float 30 so that it sinks below the surface of the water and the opposite side rises above the surface of the water. Thus, the float will take on a vertical orientation so that specimens will be drawn into the open end 14 of the net 10 with the water as the current pushes water through the net from the open end 1.4. Alternatively, the interior 40 of the tubing may be partially filled with water to sink one side of the float relative to the other side or more weight may be added to submerse the float while maintaining the tilted or vertical attitude.

In addition, rather than only partially filling the interior of the tubing with water, the tubing may completely be filled with water so that the float is adjusted to near neutral buoyancy. When the float is at near neutral buoyancy, the vertical forces acting on the net do not cause the net to sink or to rise. Instead, the level of the net 10 within the body of water will be more affected by the speed at which the water passes. If the speed of the current is fairly low, the net 10 will fall to a relatively deep level. However, if the speed of the current is fairly high, the net 10 will rise to a relatively shallow level. Thus, the net can be tuned to behave in much the same way as do prior art plankton nets by setting the buoyancy to near neutral buoyancy.

The net described above has several advantages over prior art specimen collection nets. For instance, the net permits hands-free operation which allows the fishing enthusiast to begin fishing without the delay previously experienced while collecting specimens with hand-held nets. In addition, the net of the present invention permits collection in a variety of attitudes and a variety of depths by varying the buoyancy characteristics of the float. Further, the net is durable, light weight and low in cost. Finally, the net is highly flexible so that it may be collapsed for storage and transport.

The net 10 of the preferred embodiment is made of relatively few components using a simple construction. Thus, the net may be quickly produced at a relatively low cost. Although other materials may be used depending upon availability and the desired characteristics of the particular net being made, the mesh, sleeve, eyelets and bridle of the preferred embodiment are nylon. A typical steel and brass fishing clasp as shown in FIG. 1 may be used to form the fastener for attaching the net to the selected anchor point. The tubing used in the float is common ¼" flexible, clear plastic tubing having a 5/16" outer diameter and the wooden dowel used to join the ends of the tubing is ¼" in diameter and approximately one inch long. These components are joined as shown and described to produce a net having an open end approximately eight inches in diameter and a length of about one foot. The overall length of the bridle of the preferred embodiment is approximately six feet although shorter or longer lengths are also contemplated as being within the scope of this invention. These dimensions are merely typical of the preferred embodiment and it should be appreciated that other size components are also contemplated.

While the present invention has been described by reference to a specific embodiment, it should be understood that modifications and variations of the invention may be constructed without departing from the scope of the invention.

What is claimed is:

1. A collection apparatus for capturing specimens of a predetermined size floating within a body of water, the body of water extending between a generally horizontal upper surface and a lower surface, the collection apparatus comprising:

a net having a mesh surrounded by a periphery, the mesh having a mesh size smaller than the size of the specimens and large enough to permit fluid to pass therethrough;

a float connected to the net, the float having a sufficient buoyancy to maintain the net in a generally steady position relative to the upper surface of the body of water and in a generally stationary attitude relative to the upper surface of the body of water; and means for selectively varying the buoyancy of the float at one portion of the periphery of the net with respect to another portion of the periphery of the net to adjust said position and attitude of the net relative to the upper surface of the body of water, said varying means being capable of sustaining the net in a partially submerged position at said upper surface of the body of water wherein a first portion of the net periphery is raised entirely above said upper surface and a second portion of the net periphery is submerged entirely below said upper surface.

2. The collection apparatus of claim 1 wherein:

the buoyancy of the float is selectively variable to adjust the position of the net relative to the upper surface of the body of water to any predetermined position.

3. The collection apparatus of claim 2 wherein:

the float has a sealed hollow interior.

4. The collection apparatus of claim 3 wherein:

said varying means includes a fluid introduced into the hollow interior of the float to affect the buoyancy thereof.

5. The collection apparatus of claim 3 wherein:

said varying means includes a solid weight introduced into the hollow interior of the float to affect the buoyancy thereof.

6. The collection apparatus of claim 2 wherein:

said varying mean includes a weight removably attached to the periphery of the net, the night having a predetermined mass for decreasing the buoyancy of the net to increase a distance between the upper surface of the body of water and the net.

7. The collection apparatus of claim 1 further comprising:

a bridle attached to the periphery of the net for connecting the apparatus to a selected anchor point.

8. A collection apparatus for capturing specimens of a predetermined size floating within a body of water, the body of water extending between a generally horizontal upper surface and a lower surface, the collection apparatus comprising:

an annular float having a sealed hollow interior and a perimeter surrounding a central axis, the perimeter generally lying in a plane perpendicular to the central axis, the float having a buoyancy sufficient to maintain the float at a generally steady distance from the upper surface of the body of water;

a mesh bag having a periphery defining an opening, the bag periphery being attached to the perimeter of the float, the bag extending in a direction generally parallel with the central axis;

means for making the buoyancy of one portion of perimeter of the float less than the buoyancy of another portion of the perimeter of the float so that the float is sustained in a partially submerged position at said upper surface of the body of water wherein a first portion of the float is raised entirely above said upper surface and a second portion of the float is submerged entirely below said upper surface; and a bridle attached to the float for connecting the apparatus to a selected anchor point.

9. The collection apparatus of claim 8 wherein: the buoyancy of the float is selectively variable to adjust the position of the mesh bag relative to the upper surface of the body of water to any selected position.

10. The collection apparatus of claim 9 wherein:

said making means includes a fluid introduced into the hollow interior of the float to affect the buoyancy thereof.

11. The collection apparatus of claim 9 wherein:

said making means includes a solid weight introduced into the hollow interior of the float to affect the buoyancy thereof.

12. The collection apparatus of claim 9 wherein:

the buoyancy of the float is selectively variable about the periphery of the mesh bag for selectively adjusting an angle between the perimeter and the upper surface of the body of water.

* * * * *